United States Patent Office 3,644,548
Patented Feb. 22, 1972

3,644,548
PROCESS FOR PREPARING CYCLODODECA-TRIENE-1,5,9
Hirosi Takahasi, Kadomi-shi, Osaka, Masanori Tanabe, Asaka-shi, Muneaki Yamaguchi, Ikeda-shi, Osaka, and Isao Shiihara, Osaka, Japan, assignors to Asahi Kasei Kogyo Kabushiki Kaisha, Osaka, Japan
No Drawing. Filed Mar. 17, 1970, Ser. No. 20,417
Claims priority, application Japan, Mar. 24, 1969, 44/22,224
Int. Cl. C07c 3/10
U.S. Cl. 260—666 B          2 Claims

ABSTRACT OF THE DISCLOSURE

Process for preparing cyclododecatriene-1,5,9 which comprising trimerizing butadiene-1,3 by the use of a ternary catalyst consisting of a titanium compound represented by the general formula $$TiX_n(OCH_2R)_{4-n} \text{ or } TiX_n(OAr)_{4-n}$$

wherein X is a member selected from the group consisting of chlorine, bromine and iodine atom, R is a member selected from the group consisting of hydrogen atom and alkyl radical containing from 1 to 5 carbon atoms. Ar is aryl radical and $n$ is 0 or an integer from 1 to 3, an organic aluminum halide and a member selected from the group consisting of acid amides, sulfoxides, aminoxides and nitrons.

BACKGROUND OF THE INVENTION (1) Field of the invention

This invention relates to a process for preparing cyclododecatriene-1,5,9 from butadiene-1,3. More particularly, it is concerned with a process for preparing cyclododecatriene-1,5,9 by trimerizing butadiene-1,3 which comprises using a ternary catalyst consisting of a titanium compound represented by the general formula $$TiX_n(OCH_2R)_{4-n} \text{ or } TiX_n(OAr)_{4-n}$$

wherein X is chlorine, bromine or iodine atom, R is hydrogen atom or alkyl radical containing from 1 to 5 carbon atoms, Ar is aryl radical and $n$ represents 0 or an integer from 1 to 3, an organic aluminium halide and a member selected from the group consisting of acid amides, sulfoxides, aminoxides and nitrons.

(2) Description of the prior art

Prior to the invention various methods were employed for trimerizing butadiene-1,3 to produce cyclododecatrienes. There is known, for example, a method by the use of a ternary catalyst consisting of titanium tetrachloride, an organic aluminium compound and a semipolar double bond-containing compound disclosed in Japanese patent publication No. 17974/1962 and U.S. Pat. No. 3,076,045. Even when the catalyst is improved by the addition of the third component as mentioned above, cyclododecatriene-1,5,9 (abbreviated as CDT hereinbelow) is formed at a selectivity ratio of 86.4% and a formation rate of 76 g./mmole Ti/hr., as described in Example 3 of said patent specification. According to the best example, it is formed at a selectivity ratio of 93.6% and a formation rate of 90 g./mmole Ti/hr. (cf. Example 2 of said patent specification), thus indicating that the activity is not satisfactory. A very low CDT selectivity of 84% is described in the process disclosed in German Pat. No. 1,109,674 and U.S. Pat. No. 3,149,173 in which a ternary catalyst consisting of an alkoxy-titanium compound, an organic aluminium compound and a compound containing no semipolar double bond (e.g. sulfide) is employed. Despite prior extensive investigations for a variety of improved catalysts there has been discovered no catalyst with both satisfactory activity and CDT selectivity.

SUMMARY OF THE INVENTION

We have made great efforts to find a catalyst satisfactory in both activity and CDT selectivity with success, which will be described and claimed hereinafter. According to the process of this invention, it is advantageous that side reactions forming high polymer are inhibited with increase in rate of CDT formation thereby greatly improving CDT selectivity. Thus, increase in the rate of CDT formation to 110 g.–150 g./mmole Ti/hr. with a selectivity of 90% or higher is easily attained in the process of this invention.

The first component of this invention is a titanium compound represented by the general formula $$TiX_n(OCH_2R)_{4-n} \text{ or } TiX_n(OAr)_{4-n}$$

wherein R, Ar, X and $n$ are as defined above. Examples of the compound are tetramethoxytitanium,
tetraethoxytitanium,
tetra-n-propoxytitanium,
tetra-n-butoxytitanium,
tetraisobutoxytitanium,
monochlorotrimethoxytitanium,
monobromotriethoxytitanium,
monochlorotri-n-butoxytitanium,
dichlorodiethoxytitanium,
dichlorodi-n-butoxytitanium,
dibromodiisobutoxytitanium,
dichlorodi-2-methylbutoxytitanium,
dichlorodi-n-hexoxytitanium,
diiododiethoxytitanium,
trichloromono-n-butoxytitanium,
tetraphenoxytitanium,
monochlorotriphenoxytitanium,
trichloromonophenoxytitanium and the like. Mixtures thereof may be used.

The second catalytic component is an organic aluminum halide compound represented by the general formula $AlR'_mX'_{3-m}$ wherein R' is alkyl radical containing from 1 to 6 carbon atoms or aryl radical, X' is chlorine, bromide or iodine atom and $m$ is a value between 1 and 2 inclusive, examples of which are dimethylaluminium monochloride, diethylaluminium monochloride, di-n-propylaluminium monochloride, diisobutylaluminium monobromide, di-n-hexylaluminium monochloride, ethylaluminium sesquichloride, isopropylaluminium sesquibromide, phenylaluminium sesquichloride, phenylaluminium sesquibromide, methylaluminium dichloride, isobutylaluminium dichloride, n-butylaluminium dichloride, n-butylaluminium dibromide, diethylaluminium monoiodide and the like.

As examples of the third catalytic component, an acid amide, sulfoxide, aminoxide or nitron, are mentioned N, N-dimethylformamide, N,N-dimethylacetamide, dimethylsulfoxide, diphenylsulfoxide, triethylaminoxide, N,N-dimethylanilinoxide, n-propyl-N-cyclohexylnitron and the like. Especially effective among them are sulfoxides.

Proportions of the three components employed are 3–200 moles, preferably 10–100 moles of the organic aluminium halide and 1/20–10 moles of the third component acid amide, sulfoxide, aminoxide or nitron, preferably 1/10–2 moles of the acid amide or 1/2–5 moles of the sulfoxide, aminoxide or nitron per mole of the titanium compound.

Any order of the catalyst addition may be used, but addition of the third component after standing of a mixture of the titanium compound and the organic aluminium halide for a long period of time should be avoided.

The reaction of this invention is generally carried out in an inert solvent. As the inert solvent are preferably used hydrocarbons or chlorinated hydrocarbons, which include, for example, aliphatic hydrocarbons such as pentane, hexane, heptane, octane, isooctane and the like, alicyclic hydrocarbons such as cyclohexane, decahydronaphthalene and the like, aromatic hydrocarbons such as benzene, toluene, xylenes, ethylbenzene and the like, aliphatic or aromatic chlorinated hydrocarbons such as methylene trichloride and chlorobenzene and cyclododecatriene-1,5,9 which is the product of the process of this invention.

The reaction of this invention may be conducted under reduced, normal or elevated pressure. The reaction temperature is in a range between 0 and 150° C., preferably between 40 and 70° C.

The CDT thus prepared may be easily isolated from the reaction mixture by distillation following inactivation of the catalyst.

CDT produced in the present invention is a valuable starting material for organic syntheses. For example, the product may be hydrogenated. There are then obtained from CDT cyclododecene and cyclododecane. The hydrogenation products may be further oxidized to prepare corresponding dicarboxylic acids. Alternatively, CDT may be directly oxidized to produce succinic acid. The dicarboxylic acids produced from the product according to this invention are valuable raw materials for plastics such as polyamides.

products and polymers. The data indicate CDT selectivity to be 91.5%. The results are shown in Table 1.

Examples 2 and 3

The same procedures as in Example 1 were repeated except that trimethylaminoxide and n-propyl-N-cyclohexylnitron were used as the third component respectively in place of 4 mmoles of the dimethylsulfoxide. The results are shown in Table 1.

Comparative Examples 1–4

Comparisons were made with the process of this invention by repeating the same procedures as in Example 1 except the following items: No dimethylsulfoxide was used in Comparative Example 1; in place of the dimethylsulfoxide was used triphenylphosphine in Comparative Example 2 or diphenylsulfide in Comparative Example 3 and 2 mmoles of titanium tetrachloride as the titanium compound and dimethylsulfoxide were used in Comparative Example 4. The results are shown in Table 1. Comparative Examples 2 and 3 represent the case where a ternary catalyst consisting of an alkoxytitanium compound, an organic aluminium halogenide and a compound containing no semipolar double bond is employed. Comparative Example 4 represents the case where a ternary catalyst consisting of titanium tetrachloride, an organic aluminium halogenide and a compound containing semipolar double bond is used. In Comparative Example 2 worse results are produced using a ternary catalyst than those with the binary catalyst.

TABLE 1

| Third component | Molar ratio, third component/Ti | Rate of CDT formation, g./mmole Ti/hr. | Composition of the products (percent selectivity) | | |
|---|---|---|---|---|---|
| | | | CDT | Initial distillate | Polymer |
| Example: | | | | | |
| 1 ............ Dimethylsulfoxide ............ | 2 | 148 | 91.5 | 2.5 | 6.0 |
| 2 ............ Trimethylaminoxide ............ | 1 | 149 | 89.9 | 4.5 | 5.6 |
| 3 ............ n-Propyl-N-cyclohexylnitron ............ | 1 | 140 | 90.2 | 2.4 | 7.4 |
| Comparative Example: | | | | | |
| 1 ............ | 0 | 99 | 84.5 | 5.1 | 10.4 |
| 2 ............ Triphenylphosphine ............ | 1 | 75 | 73.7 | 5.5 | 20.8 |
| 3 ............ Diphenylsulfide ............ | 1 | 103 | 85.0 | 4.1 | 9.7 |
| 4 ............ TiCl₄, 2 mmoles; dimethylsulfoxide, 4 mmoles ............ | | 112 | 89.1 | 3.5 | 9.5 |

PREFERRED EMBODIMENTS OF THE INVENTION

The following examples are illustrative of the invention.

Example 1

A one-liter four-necked flask equipped with a stirrer, thermometer, gas-inlet tube and cooler was purged with nitrogen gas, followed by addition of 150 ml. of dry toluene, 2 mmoles of tetra-n-butoxytitanium and 4 mmoles of dimethylsulfoxide, and then of 36 mmoles of ethylaluminium sesquichloride. Temperature of the mixture was raised to 50° C. and then gaseous butadiene-1,3 was introduced thereinto with stirring. The supply of butadiene-1,3 was controlled so as to have almost all the introduced butadiene-1,3 absorbed. The flask was cooled with ice water in order to maintain the reaction temperature of 50° C.±2° C. 140.4 l. of butadiene-1,3 were obsorbed in 1 hour, when the supply of butadiene-1,3 was discontinued and stirring was then contained for additional 10 min. After completion of the reaction the catalyst was decomposed by addition of a small amount of methanol. The reaction mixture was subjected to distillation under reduced pressure after removal of the decomposed product of the catalyst and the whole distillate was analyzed by gas chromatography. There were produced 295 g. of CDT (148 g./mmole Ti/hr.), 8 g. of the initial distillate including vinylcyclohexenes, cyclooctadienes and the like and 19.5 g. of high-boiling Example 4

A one-liter four-necked flask equipped with a stirrer, thermometer, gas-inlet tube and cooler was purged with nitrogen gas. There were mixed 150 ml. of dry toluene, 2 mmoles of dichlorodi-n-butoxytitanium, 6 mmoles of diethylaluminium monochloride and 28 mmoles of ethylaluminium sesquichloride, immediately followed by addition of 3 mmoles of dimethylsulfoxide. The inner temperature was raised to 50° C. and then gaseous butadiene was introduced thereinto with stirring. The amount of butadiene adsorbed in 1 hr. was 218.8 l. There were produced 411 g. of CDT (205.5 g./mmole Ti/hr.), 9 g. of the initial distillate and 23 g. of the byproduct polymer, thus indicating CDT selectivity of 92.6%.

Examples 5–7

The same procedures as in Example 4 were repeated except that in place of 3 mmoles of the dimethylsulfoxide were employed triethylaminoxide, N,N-diethylacetamide and n-propyl-N-cyclohexylnitron respectively as the third component. The results are shown in Table 2.

Comparative Examples 5–7

Comparisons were made with the process of this invention by repeating the same procedures as in Example 4 except the following items: No dimethylsulfoxide was used in Comparative Example 5 and in place of the dimethylsulfoxide was used triphenylphosphine in Comparative Example 6 or diphenylsulfide in Comparative Example 7. The results are shown in Table 2.

A similar experiment without the diphenylsulfoxide added gave a rate of CDT formation of 122 g./mmole Ti/hr. and CDT selectivity of 89.9%.

TABLE 2

| Third component | | Molar ratio, third component/Ti | Rate of CDT formation, g./mmole Ti/hr. | Composition of the products (percent selectivity) | | |
|---|---|---|---|---|---|---|
| | | | | CDT | Initial distillate | Polymer |
| Example: | | | | | | |
| 4 | Dimethylsulfoxide | 1.5 | 206 | 92.6 | 2.2 | 5.2 |
| 5 | Triethylaminoxide | 1 | 185 | 90.4 | 3.2 | 6.4 |
| 6 | N,N-diethylacetamide | 0.5 | 174 | 91.2 | 2.1 | 6.7 |
| 7 | n-Propylcyclohexylnitron | 1 | 191 | 89.6 | 4.7 | 5.7 |
| Comparative Example: | | | | | | |
| 5 | | 0 | 144 | 86.5 | 2.5 | 11.0 |
| 6 | Triphenylphosphine | 1 | 98 | 75.6 | 4.8 | 19.6 |
| 7 | Diphenylsulfide | 1.5 | 155 | 88.0 | 3.7 | 8.3 |

Example 8

A two-liter four-necked flask equipped with a stirrer, thermometer, gas-inlet tube and cooler was purged with helium gas, followed by addition of 200 ml. of dry toluene, 3 mmoles of tetraphenoxytitanium, and 2.5 mmoles of dimethylformamide and then of 45 mmoles of ethylaluminium sesquichloride to prepare the catalyst. The inner temperature was raised to 60° C. and gaseous butadiene was introduced thereinto with stirring. The reaction was continued for 2 hours. The rate of CDT formation was 120 g./mmole Ti/hr. and the selectivity was 89.3% of CDT, 1.4% of the initial distillate and 9.3% of polymers.

A similar experiment without the dimethylformamide added gave a rate of CDT formation of 92 g./mmole Ti/hr. and selectivity being 86.7% of CDT, 1.7% of the initial distillate and 11.6% of polymers.

Example 9

A two-liter four-necked flask equipped with a stirrer, thermometer, gas inlet tubing and cooler was purged with helium gas. There were mixed 100 ml. of dry toluene, 3 mmoles of tetraisobutoxytitanium and 6 mmoles of dimethylsulfoxide, followed by addition of 54 mmoles of a 7:1 mixture of ethylaluminium sesquichloride and ethylaluminium dichloride to prepare the catalyst. The inner temperature was raised to 60° C. and gaseous butadiene was introduced thereinto with stirring. The reaction was continued for 2 hours. The rate of CDT formation was 122 g./mmole Ti/hr. and the selectivity was 92.4% of CDT, 1.1% of the initial distillate and 6.5% of polymers.

A similar experiment without the dimethylsulfoxide added gave a rate of CDT formation of 108 g./mmole Ti/hr. and selectivity being 88.6% of CDT, 1.9% of the initial distillate and 9.5% of polymers.

Example 10

The same procedures as in Example 9 were repeated except that 1.5 mmoles of dimethylformamide were used in place of 6 mmoles of the dimethylsulfoxide. The rate of CDT formation was 130 g./mmole Ti/hr. and the selectivity was 91.5% of CDT, 1.2% of the initial distillate and 7.3% of polymers.

Example 11

A two-liter four-necked flask equipped with a stirrer, thermometer, gas-inlet tube and cooler was purged with argon gas. There were mixed 100 ml. of dry benzene, 3 mmoles of di-3-methylbutoxydichlorotitanium and 6 mmoles of diphenylsulfoxide, followed by addition of 48 mmoles of a 7:1 mixture of methylaluminium sesquichloride and dimethylaluminium chloride to prepare the catalyst. The inner temperature was raised to 60° C. and gaseous butadiene was introduced thereinto for 2 hours. The rate of CDT formation was 144 g./mmole Ti/hr. and the CDT selectivity was 92.0%.

Example 12

A one-liter four-necked flask equipped with a stirrer, thermometer, gas-inlet tube and cooler was purged with argon gas. There were mixed 150 ml. of dry toluene, 2 mmoles of tetramethoxytitanium, and 2 mmoles of dibenzylsulfoxide, followed by addition of 36 mmoles of a 8:1 mixture of ethylaluminium sesquichloride and ethylaluminium dichloride to prepare the catalyst. The inner temperature was raised to 60° C., at which temperature gaseous butadiene was introduced thereinto for 1 hours. The rate of CDT formation was 168 g./mmole Ti/hr. and the CDT selectivity was 93.7%.

Example 13

A one-liter four-necked flask equipped with a stirrer, thermometer, gas-inlet tube and cooler was purged with argon gas. There were mixed 150 ml. of dry toluene, 2 mmoles of tri-n-hexoxymonobromotitanium, and 2 mmoles of dimethylsulfoxide, followed by addition of 36 mmoles of ethylaluminium sesquichloride. Gaseous butadiene was then introduced thereinto for 1 hour. The rate of CDT formation was 149 g./mmole Ti/hr. and the CDT selectivity was 92.1%.

What is claimed is:

1. Process for preparing cyclododecatriene-1,5,9 which comprising trimerizing butadiene-1,3 at a temperature of from 0° to 150° C. by the use of a ternary catalyst consisting of a titanium compound represented by the general formula selected from the group consisting of $$TiX_n(OCH_2R)_{4-n} \text{ and } TiX_n(OAr)_{4-n}$$

wherein X is a member selected from the group consisting of chlorine, bromine and iodine atom, R is a member selected from the group consisting of hydrogen atom and alkyl radical containing from 1 to 5 carbon atoms, Ar is aryl radical and $n$ is 0 or an integer from 1 to 3, an organic aluminium halide and a member selected from the group consisting of acid amides, sulfoxides, aminoxides and nitrons.

2. Process according to claim 1 wherein 3–200 moles of the organic aluminium halide and 1/20–10 moles of the member selected from the group consisting of acid amides, sulfoxides, aminoxides and nitrons are used per mole of the titanium compound.

References Cited

UNITED STATES PATENTS

| 3,076,045 | 1/1963 | Schneider et al. | 260—666 B |
| 3,214,484 | 10/1965 | Wittenberg et al. | 260—666 B |
| 3,149,173 | 9/1964 | Wittenberg et al. | 260—666 B |

DELBERT E. GANTZ, Primary Examiner

V. O'KEEFE, Assistant Examiner